(12) United States Patent
Choi

(10) Patent No.: US 10,190,252 B2
(45) Date of Patent: Jan. 29, 2019

(54) DRY-CLEANING SOLVENT FILTER APPARATUS FOR ENVIRONMENTALLY-FRIENDLY REUSE AND METHOD OF OPERATING THEREOF

(71) Applicant: Eung Chul Choi, Fair Oaks, CA (US)

(72) Inventor: Eung Chul Choi, Fair Oaks, CA (US)

(*) Notice: Subject to any disclaimer, the term of this patent is extended or adjusted under 35 U.S.C. 154(b) by 0 days.

(21) Appl. No.: 15/607,478

(22) Filed: May 27, 2017

(65) Prior Publication Data

US 2018/0340293 A1    Nov. 29, 2018

(51) Int. Cl.
| | | |
|---|---|---|
| *B01D 29/00* | (2006.01) | |
| *D06L 1/10* | (2006.01) | |
| *D06F 43/00* | (2006.01) | |
| *D06F 43/08* | (2006.01) | |
| *D06B 9/06* | (2006.01) | |

(52) U.S. Cl.
CPC ............. *D06L 1/10* (2013.01); *D06F 43/007* (2013.01); *D06F 43/085* (2013.01); *D06F 2226/00* (2013.01)

(58) Field of Classification Search
CPC .......... D06F 43/00; D06F 43/07; D06F 43/02; D06F 43/04; D06F 43/06; D06F 43/08; D06F 43/081; D06F 43/085; B01D 35/027; B01D 35/30; B01D 24/00; B01D 24/02; B01D 24/04; B01D 24/12; B01D 24/14; B01D 29/05; B01D 29/085; B01D 29/00; B01D 29/01; B01D 29/012; B01D 29/56; B01D 33/00; B01D 2101/00; B01D 2101/04; B01D 2201/00; B01D 2201/04; B01D 2201/0407; B01D 2201/0415; B01D 2201/30; B01D 2201/307; B01D 2313/20; B01D 2313/32; C02F 9/00; D06L 1/00;
(Continued)

(56) References Cited

U.S. PATENT DOCUMENTS 2,053,103 A * 9/1936 Passar ................... D06F 43/081
                                                            68/18 R
3,225,572 A * 12/1965 Robbins ............... D06F 43/085
                                                            68/18 F
(Continued)

*Primary Examiner* — Allison G Fitzsimmons
(74) *Attorney, Agent, or Firm* — Invent Capture, LLC; Samuel S. Cho

(57) ABSTRACT

A commercial dry-cleaning solvent filter apparatus is configured to filter and decontaminate a used dry-cleaning solvent in a specialized multi-level filtration container to enable environmentally-friendly reuse of the used dry-cleaning solvent in a commercial dry-cleaning machine after a novel decontamination process. The commercial dry-cleaning solvent filter apparatus incorporates multi-level gravity feed filtration chambers filled with a unique multi-metallic and multi-chemical filtration "clay" agent in multiple stages for comprehensive decontamination of the used dry-cleaning solvent. The filtered and decontaminated used dry-cleaning solvent is reusable and can be pumped back into a dry-cleaning solvent tank internal to the commercial dry-cleaning machine. The reuse of the dry-cleaning solvent reduces the need for frequent solvent replacements. The movement of the used dry-cleaning solvent into or out of the commercial dry-cleaning machine and the commercial dry-cleaning solvent filter apparatus is further assisted by a motorized pump mobilizing the used dry-cleaning solvent.

7 Claims, 6 Drawing Sheets

A Frontal View of a Dry-Cleaning Solvent Filter Apparatus Connected to a Dry-Cleaning Machine for Environmentally-Friendly Reuse of Dry-Cleaning Solvents

(58) Field of Classification Search
CPC .... D06L 1/02; D06L 1/08; D06L 1/10; D06B 9/06
USPC ....... 210/455, 465, 498, 205, 206, 263, 265, 210/283, 284, 290, 291; 134/109, 110, 134/111, 10, 12; 68/18 R, 18 C, 18 D, 68/18 F
See application file for complete search history.

(56) References Cited

U.S. PATENT DOCUMENTS

| | | | |
|---|---|---|---|
| 3,730,347 A | | 5/1973 | Giampalmi, Jr. et al. |
| 3,836,005 A | | 9/1974 | Bauer |
| 4,266,412 A | | 5/1981 | Merenda |
| 4,793,938 A | | 12/1988 | Dayton |
| 5,427,683 A | * | 6/1995 | Gershon ................ B01D 35/12 210/264 |
| 5,653,873 A | * | 8/1997 | Grossman ................ B01D 3/00 202/176 |
| 7,637,127 B2 | | 12/2009 | Mills et al. |
| 2005/0262645 A1 | | 12/2005 | Yang et al. |
| 2007/0095110 A1 | | 5/2007 | Naber et al. |

* cited by examiner

A Frontal View of a Dry-Cleaning Solvent Filter Apparatus Connected to a Dry-Cleaning Machine for Environmentally-Friendly Reuse of Dry-Cleaning Solvents

100

A Detailed View of a Dry-Cleaning Solvent Filter Apparatus for Environmentally-Friendly Reuse of Dry-Cleaning Solvents

200

A Top View of a Dry-Cleaning Solvent Filter Apparatus for Environmentally-Friendly Reuse of Dry-Cleaning Solvents

300

A Bottom Surface of Each Filter Stage in a Multi-Level Filtration Container Included in a Dry-Cleaning Solvent Filter Apparatus for Environmentally-Friendly Reuse of Dry-Cleaning Solvents

400

| | |
|---|---|
| SiO₂ (Silica) | 65.2 % |
| Al₂O₃ (Aluminum Oxide) | 13.0 % |
| Fe₂O₃ (Ferric Oxide) | 6.0 % |
| MgO (Magnesium Oxide) | 1.7 % |
| CaO (Calcium Oxide) | 0.5 % |
| Na₂O (Sodium Oxide) | 0.5 % |
| K₂O (Potassium Oxide) | 0.5 % |
| IG-loss | 9.0 % |
| Miscellaneous (moisture, etc.) | 3.6 % |

An Example of a Novel "Clay" Filtration Agent Comprising Unique Multi-Metallic and Multi-Chemical Compounds for Utilization in Each Filter Stage of the Dry-Cleaning Solvent Filter Apparatus

DRY-CLEANING SOLVENT FILTER APPARATUS FOR ENVIRONMENTALLY-FRIENDLY REUSE AND METHOD OF OPERATING THEREOF

BACKGROUND OF THE INVENTION

In recent years, commercial laundry industry has confronted a variety of environmental challenges. A typical commercial laundry operation consumes various fabric-cleaning solvents and chemicals, which are becoming too costly for complying with ever-increasing environmental regulations. A "dry clean" process was invented in the mid-$19^{th}$ century and became a symbol of the commercial laundry industry. The dry clean process uses chemical agents instead of water and is effective in cleaning wool, silk, fur, and other fabric types which are difficult to clean with water. A first generation of dry cleaning methods generally used petrochemical solvents such as kerosene and even gasoline. Because kerosene and gasoline were found to be excessively flammable and outright dangerous for use in a commercial laundry facility, less flammable petrochemical agents such as a paraffin-derived "Stoddard solvent" were widely used until the 1950's.

The petrochemical solvents used in the first generation of dry cleaning were still frequently susceptible to fire and explosions, and a safer dry-cleaning solvent was need in the industry. Starting in the 1930's, tetrachloroethylene, also known as perchloroethylene or "perc" in short, was discovered to be a very effective and non-flammable dry-cleaning agent. Perc was also gentle to many sensitive garments such as silk and wool. The use of perc in dry cleaning became a defacto industry standard by the mid-$20^{th}$ century and still is a common choice for dry cleaning operations.

However, in the 1990's, tetrachloroethylene was declared to be a carcinogen against humans and a contaminating agent on the Earth's atmosphere. For example, in 1993, the California Air Resources Board devised an airborne toxic control measure to reduce perc emissions from commercial laundry facilities. Many commercial laundry facilities today face strict environmental standard restrictions and even a general phase-out of perc-based dry cleaning machines. Although more eco-friendly chemical agents such as glycol ethers and decamethylcyclopentasiloxane (D5) were devised, increasingly stringent environmental regulations against any chemical dry-cleaning agents and a high cost of operation and equipment have prevented the commercial laundry industry from rapidly adopting such eco-friendly alternatives.

An undesirable alternative to dry cleaning is simply a "wet clean" process, which agitates garments immersed in water with an injection of biodegradable detergents, similar to a modern household washing machine which uses water. Unfortunately, the wet clean process is very undesirable in a commercial laundry operation because only a limited number of fabric types can be treated with a wet-cleaning machine. Furthermore, even fabric types which can be washed with water experience an unacceptable level of shrinkage, wrinkling, and/or damage to garments in a high-volume commercial laundry operation. A laundry facility using water-based wet-cleaning machine inevitably spends an exorbitant amount of time for mitigating shrinkage and wrinkling of garments before a garment press machine can be used. Furthermore, the cost of a water-based wet cleaning machine tends to be even more expensive than a dry cleaning machine.

If a conventional dry-cleaning machine operator could repeatedly reuse perc or other dry-cleaning solvents without frequent replenishment, the operator's costs associated with raw materials and environmental regulations may be reduced dramatically. Furthermore, repeated reuse of already-used dry-cleaning solvents in commercial dry-cleaning operation may also reduce environmental contamination and damage associated with disposing perc and other harmful chemicals from commercial dry cleaning operations. Unfortunately, conventional dry-cleaning machines do not incorporate robust filtering agents or mechanisms to fully decontaminate or detoxify soiled dry-cleaning solvents. At best, conventional dry-cleaning machines only provide basic particulate filtering through an internal mesh filtering unit, which is generally insufficient for removing undesirable odors and contaminated substances from already-used dry-cleaning solvents.

Therefore, it may be desirable to devise a novel dry-cleaning solvent filter apparatus that provides robust decontamination, odor removal, and rejuvenation of dry-cleaning solvents to enable repeated reuse of such reclaimed solvents in commercial dry cleaning operations. Furthermore, it may also be desirable to devise a novel dry-cleaning solvent filter apparatus that can be externally connected to or internally incorporated into a conventional dry-cleaning machine with minimal design modifications to the conventional dry-cleaning machine itself for convenient before-market or aftermarket design integrations and installations.

In addition, it may also be desirable to devise a novel filtration agent comprising unique multi-metallic and multi-chemical compounds for robust decontamination of used dry-cleaning solvents in a novel dry-cleaning solvent filter apparatus. Moreover, it may also be desirable to devise a method of operating a novel dry-cleaning solvent filter apparatus to provide robust decontamination, odor removal, and rejuvenation of dry-cleaning solvents to enable repeated reuse of such reclaimed solvents in commercial dry cleaning operations.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a dry-cleaning solvent filter apparatus is configured to deodorize, detoxify, and reclaim a contaminated dry-cleaning solvent. The dry-cleaning solvent filter apparatus comprises: an intake pipe connecting a dry-cleaning machine and a dry-cleaning solvent reserve tank; the dry-cleaning solvent reserve tank operatively connected to the dry-cleaning machine via the intake pipe, wherein the intake pipe brings a contaminated dry-cleaning solvent from the dry-cleaning machine into the dry-cleaning solvent reserve tank prior to filtration; a multi-level filtration container comprising a first-stage filter chamber with a first set of micro holes, a second-stage filter chamber with a second set of micro holes, and a multi-metallic and multi-chemical clay filtration agent deposited in the first-stage filter chamber and the second-stage filter chamber for deodorizing and decontaminating the contaminated dry-cleaning solvent; a reserve tank-to-filtration container pipe that connects the dry-cleaning solvent reserve tank and the multi-level filtration container to mobilize the contaminated dry-cleaning solvent from the dry-cleaning reserve tank to a top portion of the multi-level filtration container; and an outtake pipe connecting a treated solvent outlet of the multi-level filtration container to a fresh dry-cleaning solvent reserve tank inside the dry-cleaning machine, wherein the outtake pipe carries a deodorized and decontaminated dry-cleaning solvent that has been treated by the multi-level filtration container.

BRIEF DESCRIPTION OF DRAWINGS

FIG. 5 shows an example of a novel "clay" filtration agent comprising unique multi-metallic and multi-chemical compounds for utilization in each filter stage of the dry-cleaning solvent filter apparatus, in accordance with an embodiment of the invention.

DETAILED DESCRIPTION

Figure 1:
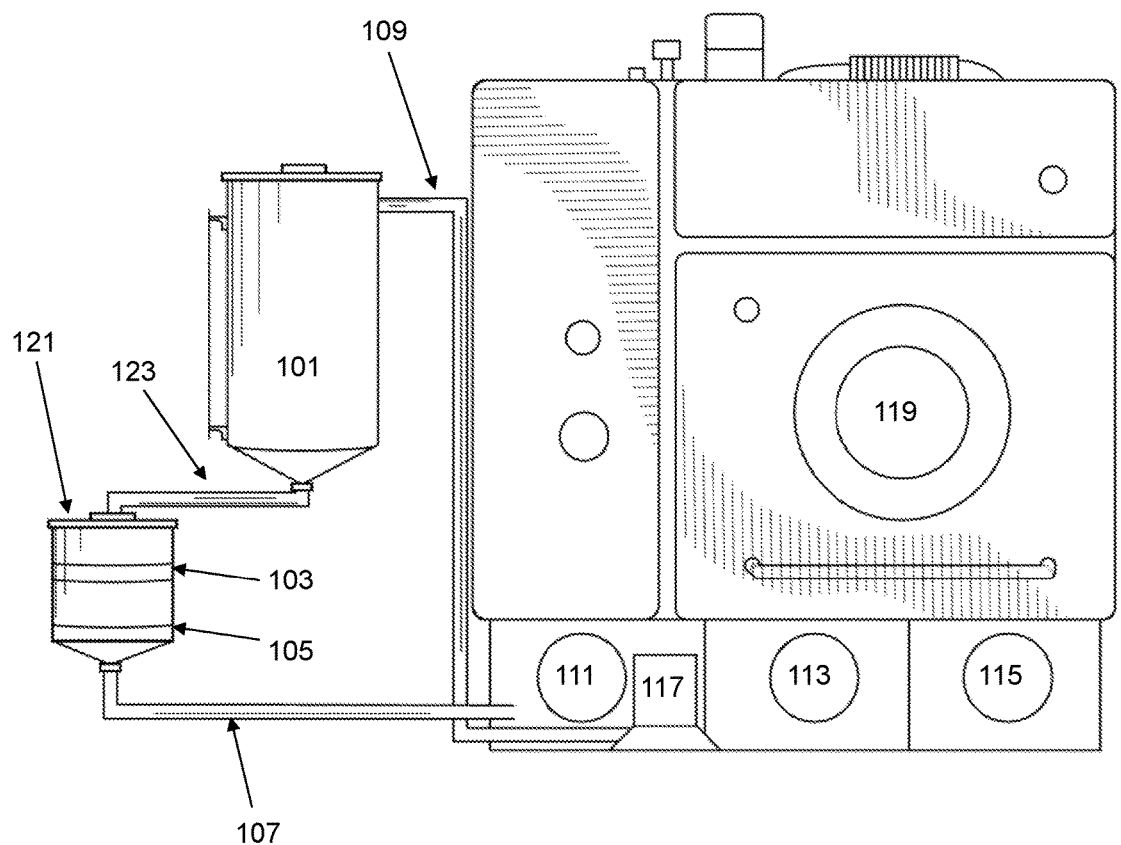
FIG. 1 shows a frontal view of a dry-cleaning solvent filter apparatus connected to a dry-cleaning machine for environmentally-friendly reuse of dry-cleaning solvents, in accordance of an embodiment of the invention.

Specific embodiments of the invention will now be described in detail with reference to the accompanying figures. Like elements in the various figures are denoted by like reference numerals for consistency.

In the following detailed description of the present invention, numerous specific details are set forth in order to provide a thorough understanding of the present invention. However, it will become obvious to those skilled in the art that the present invention may be practiced without these specific details. In other instances, well known methods, procedures, and/or components have not been described in detail to avoid unnecessarily obscuring aspects of the present invention. The detailed description is presented largely in terms of procedures, logic blocks, processing, and/or other symbolic representations that directly or indirectly resemble a dry-cleaning solvent filter apparatus, a novel "clay" filtration agent utilized in each filter stage of the dry-cleaning solvent filter apparatus, and/or a method of operating the dry-cleaning solvent filter apparatus. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

This invention generally relates to laundry machines. More specifically, the present invention relates to utilizing a novel dry-cleaning solvent filter apparatus that is configured to connect to or incorporated into a conventional dry-cleaning machine structure. Furthermore, the present invention relates to providing a robust deodorization and decontamination of used dry-cleaning solvents via a novel clay filtration agent and a multi-stage filtration process to transform the contaminated dry-cleaning solvents to be readily reusable for subsequent dry-cleaning operations. In addition, the present invention also relates to providing a method of operating the dry-cleaning solvent filter apparatus for efficient deodorization, decontamination, and reclamation of a used dry-cleaning solvent for subsequent reuse in dry-cleaning operations.

FIG. 1 shows a frontal view (100) of a dry-cleaning solvent filter apparatus connected to a dry-cleaning machine for environmentally-friendly reuse of dry-cleaning solvents, in accordance of an embodiment of the invention. In a preferred embodiment of the invention, the dry-cleaning solvent filter apparatus includes an intake pipe (109) connecting a dry-cleaning machine (119) and a dry-cleaning solvent reserve tank (101). The dry-cleaning solvent reserve tank (101) is typically an external aftermarket unit that is connected to the dry-cleaning machine (119) via the intake pipe (109), wherein the intake pipe (109) brings a contaminated dry-cleaning solvent into the dry-cleaning solvent reserve tank (101) from a dry-cleaning machine's internal reserve tank (e.g. 113 or 115) that stores the used, soiled, and/or contaminated dry-cleaning solvent.

As shown in FIG. 1, the mobilization of the contaminated dry-cleaning solvent from the dry-cleaning machine's internal reserve tank (e.g. 113 or 115) to the dry-cleaning solvent reserve tank (101) may be assisted by a motorized pump (117). In the preferred embodiment of the invention, the motorized pump (117) proactively pressures the contaminated dry-cleaning solvent stored in the dry-cleaning machine's internal reserve tank (e.g. 113 or 115) to be relocated into the dry-cleaning solvent reserve tank (101) through the intake pipe (109). Once the contaminated dry-cleaning solvent is relocated and stored in the dry-cleaning solvent reserve tank (101), which is typically positioned outside of the dry-cleaning machine, a rigorous filtration, deodorization, and decontamination can be performed inside a multi-level filtration container (121), as the contaminated dry-cleaning solvent undergoes treatment. In an alternate embodiment of the invention, the dry-cleaning solvent reserve tank (101) and the multi-level filtration container (121) may be integrated into an outer casing of the dry-cleaning machine (119) with necessary internal intake, intermediate, and outtake pipes.

Figure 4:
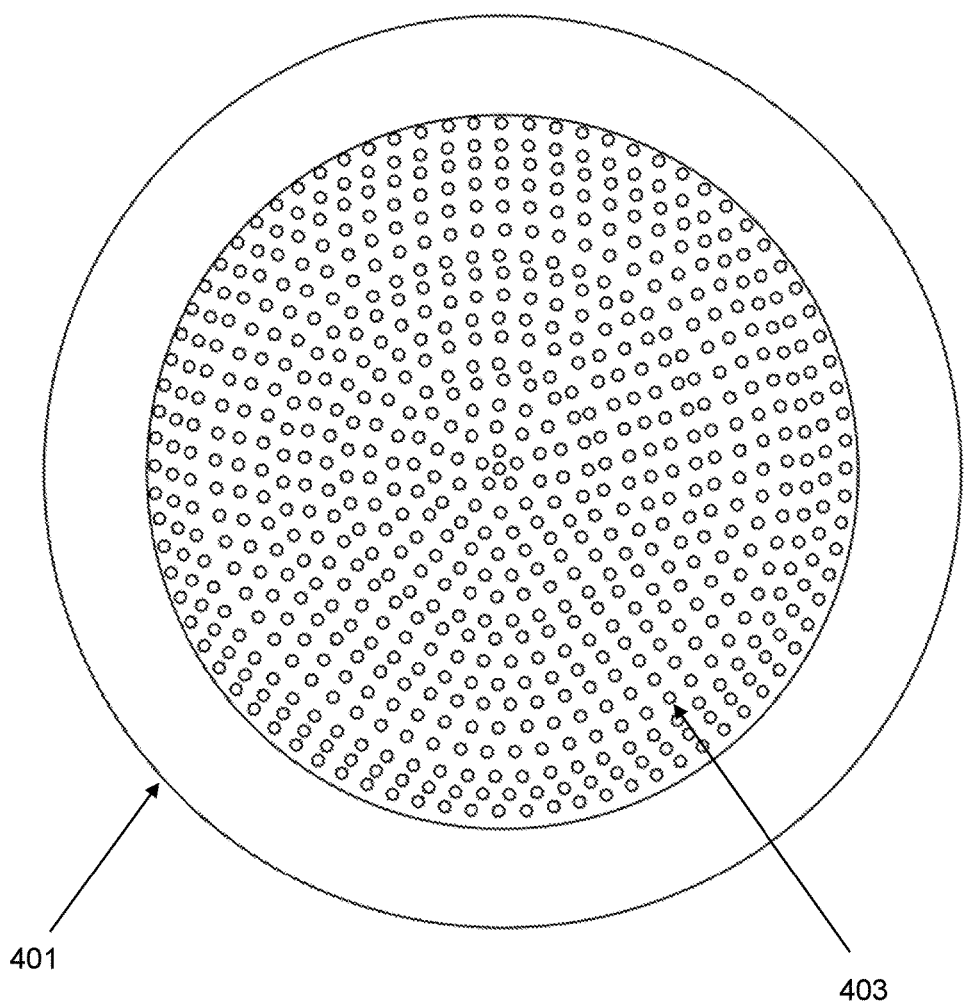
FIG. 4 shows a bottom surface of each filter stage in a multi-level filtration container included in a dry-cleaning solvent filter apparatus for environmentally-friendly reuse of dry-cleaning solvents, in accordance with an embodiment of the invention.

Continuing with FIG. 1, the multi-level filtration container (121) in the dry-cleaning solvent filter apparatus comprises a first-stage filter chamber (103) and a second-stage filter chamber (105). Each stage filter chamber (i.e. 103 or 105) incorporates micro holes on a bottom surface of the chamber, wherein the micro holes are configured to keep the particle integrity of a multi-metallic and multi-chemical clay filtration agent from getting washed away when the contaminated dry-cleaning solvent undergoes a multiple-stage filtration process, which may be based on a gravity feed system, as shown in FIG. 1. An example of the bottom surface of each stage filter chamber with micro holes is illustrated in FIG. 4.

In the preferred embodiment of the invention, a two-stage filtration process is utilized with a layer of the multi-metallic and multi-chemical clay filtration agent in each stage, which provides substantial decontamination and deodorization of the contaminated dry-cleaning solvent. The reclaimed dry-cleaning solvent that has been treated by the multi-metallic and multi-chemical clay filtration agent in the multi-level filtration container (121) is qualitatively and chemically similar or identical to a fresh dry-cleaning solvent, and does not exhibit foul odor or degraded cleaning properties, thus enabling the reuse of the reclaimed dry-cleaning solvent after an extensive filtration and treatment provided by the multi-level filtration container (121).

As shown in FIG. 1, the multi-level filtration container (121) and the dry-cleaning solvent reserve tank (101) is connected by a reserve tank-to-filtration container pipe (123) for mobilizing the contaminated dry-cleaning solvent from the dry-cleaning solvent reserve tank (101) to a top portion of the multi-level filtration container (121). In the preferred embodiment of the invention, the movement of the contaminated dry-cleaning solvent is assisted by a gravity feed container design, wherein the dry-cleaning solvent reserve tank (101) is located at a higher elevation relative to the elevation of the multi-level filtration container (121), as shown in FIG. 1.

Furthermore, the dry-cleaning solvent filter apparatus also includes an outtake pipe (107) that connects the treated solvent outlet of the multi-level filtration container (121) to a fresh dry-cleaning solvent reserve tank (111) inside the dry-cleaning machine (119). The outtake pipe (107) is configured to carry a deodorized and decontaminated dry-cleaning solvent that has been treated by the multi-level filtration container (121). In the preferred embodiment of the invention, the treated solvent outlet is located near the bottom of the multi-level filtration container (121), as the gravity feed concept is utilized for multi-stage filtration and treatment of the contaminated dry-cleaning solvent for conversion into the deodorized and decontaminated dry-cleaning solvent that can be pumped back into the dry-cleaning machine (119).

Figure 2:
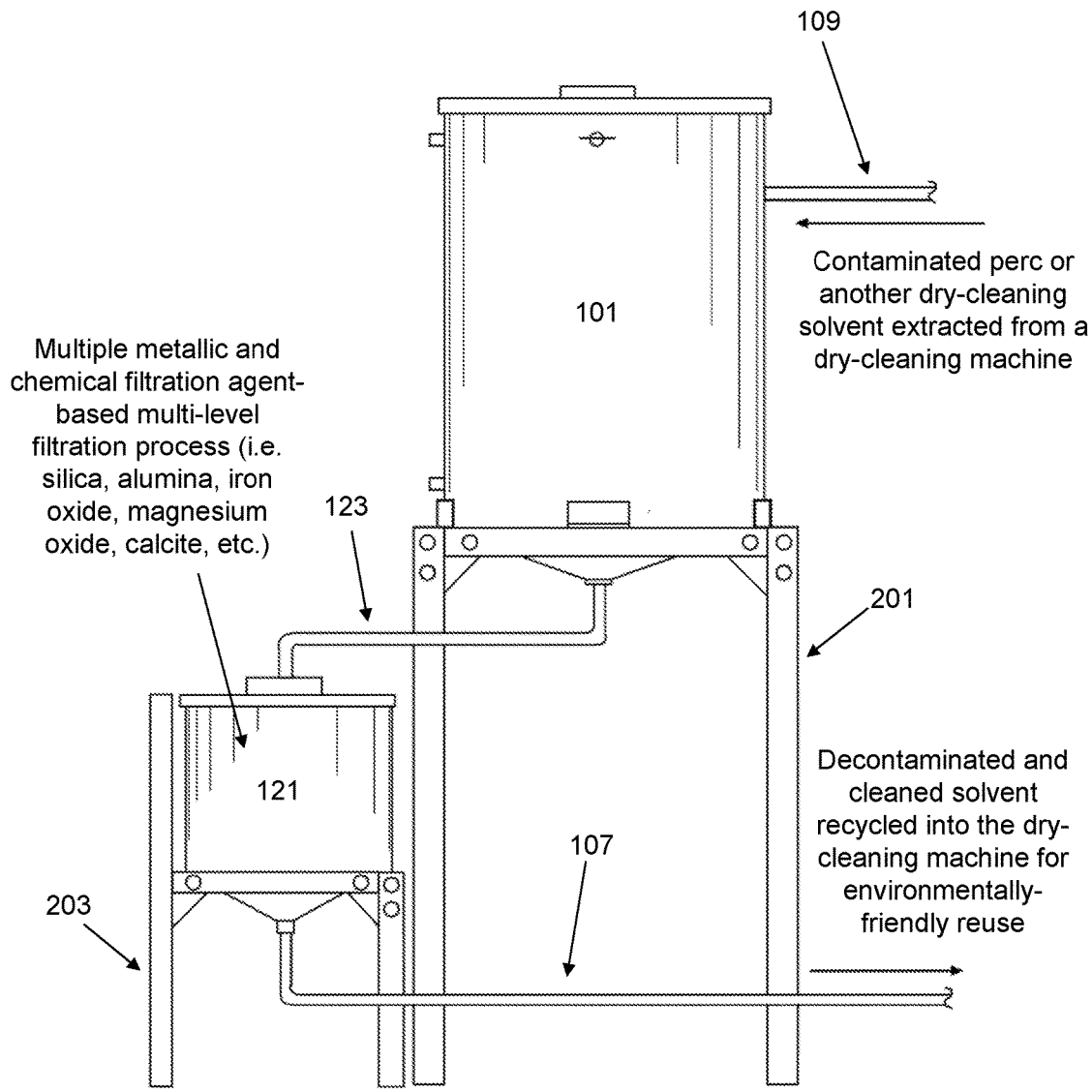
FIG. 2 shows a detailed view of a dry-cleaning solvent filter apparatus for environmentally-friendly reuse of dry-cleaning solvents, in accordance with an embodiment of the invention.

FIG. 2 shows a detailed view (200) of a dry-cleaning solvent filter apparatus for environmentally-friendly reuse of dry-cleaning solvents, in accordance with an embodiment of the invention. In this embodiment of the invention, the dry-cleaning solvent filter apparatus includes an intake pipe (109) connecting a dry-cleaning machine and a dry-cleaning solvent reserve tank (101). The dry-cleaning solvent reserve tank (101) is typically an external aftermarket unit that is connected to the dry-cleaning machine via the intake pipe (109), wherein the intake pipe (109) brings a contaminated dry-cleaning solvent (i.e. used perchloroethylene, etc.) into the dry-cleaning solvent reserve tank (101) from a dry-cleaning machine's internal reserve tank that stores the used, soiled, and/or contaminated dry-cleaning solvent.

In one embodiment, the mobilization of the contaminated dry-cleaning solvent from the dry-cleaning machine's internal reserve tank to the dry-cleaning solvent reserve tank (101) may be assisted by a motorized pump. The motorized pump is configured to provide pressure to the contaminated dry-cleaning solvent stored in the dry-cleaning machine's internal reserve tank to relocate the contaminated dry-cleaning solvent to the dry-cleaning solvent reserve tank (101) through the intake pipe (109). Once the contaminated dry-cleaning solvent is relocated and stored in the dry-cleaning solvent reserve tank (101), which is typically positioned outside of the dry-cleaning machine, a rigorous filtration, deodorization, and decontamination can be performed inside a multi-level filtration container (121), as the contaminated dry-cleaning solvent undergoes treatment. In an alternate embodiment of the invention, the dry-cleaning solvent reserve tank (101) and the multi-level filtration container (121) may be integrated into an outer casing of the dry-cleaning machine with necessary internal intake, intermediate, and outtake pipes.

Continuing with FIG. 2, the multi-level filtration container (121) in the dry-cleaning solvent filter apparatus comprises a first-stage filter chamber and a second-stage filter chamber. Each stage filter chamber preferably incorporates micro holes on a bottom surface of the chamber, wherein the micro holes are configured to keep the particle integrity of a multi-metallic and multi-chemical clay filtration agent from getting washed away when the contaminated dry-cleaning solvent undergoes a multiple-stage filtration process, which may be based on a gravity feed system, as shown in FIG. 2. An example of the bottom surface of each stage filter chamber with micro holes is illustrated in FIG. 4.

In one embodiment of the invention, a two-stage filtration process is utilized with a layer of the multi-metallic and multi-chemical clay filtration agent in each stage, which provides substantial decontamination and deodorization of the contaminated dry-cleaning solvent. In another embodiment of the invention, three stage or other multi-stage filtration process may be utilized, depending on the level of toxicity and the contamination of the used dry-cleaning solvent. Typically, a higher number of filtration stages enables a higher decontamination performance, which may be measured by removal of heavy or toxic metals such as arsenic and mercury, deacidification of the used dry-cleaning solvent, and deodorization of foul smells.

In some embodiments of the invention, a conventional dry-cleaning machine may incorporate a conventional particle filter to remove dirt and particles from the used dry-cleaning solvent, even before the novel dry-cleaning solvent filter apparatus of the present invention is utilized. However, the conventional particle filter in the conventional dry-cleaning machine is unable to remove any substantial amount of undesirable heavy metals, and is also incapable of deodorizing or deacidifying the used/contaminated dry-cleaning solvent. Therefore, installing the novel dry-cleaning solvent filter apparatus of the present invention, as an aftermarket system or as a factory-spec before-market design embedded in a casing of a dry-cleaning machine, can dramatically reduce dry-cleaning solvent replacement needs, as proactively-treated and reclaimed used dry-cleaning solvent can be recycled back into commercial dry cleaning operations for multiple reuses.

The reclaimed dry-cleaning solvent that has been treated by the multi-metallic and multi-chemical clay filtration agent in the multi-level filtration container (121) is qualitatively and chemically similar or identical to a fresh dry-cleaning solvent, and does not exhibit foul odor or degraded cleaning properties, thus enabling the reuse of the reclaimed dry-cleaning solvent after an extensive filtration and treatment provided by the multi-level filtration container (121).

As shown in FIG. 2, the multi-level filtration container (121) and the dry-cleaning solvent reserve tank (101) is connected by a reserve tank-to-filtration container pipe (123) for mobilizing the contaminated dry-cleaning solvent from the dry-cleaning solvent reserve tank (101) to a top portion of the multi-level filtration container (121). In the preferred embodiment of the invention, the movement of the contaminated dry-cleaning solvent is assisted by a gravity feed container design, wherein the dry-cleaning solvent reserve tank (101) is located at a higher elevation relative to the elevation of the multi-level filtration container (121), as shown in FIG. 2. For example, in context of the embodiment of the invention as shown in FIG. 2, a reserve tank holder (201) is taller than a filtration container holder (203), thus enabling the gravity feed-based fluid movement from the dry-cleaning solvent reserve tank (101) to the top portion of the multi-level filtration container (121). Similarly, a bottom portion of the multi-level filtration container (121) may incorporate a conical liquid-gathering component near the treated solvent outlet of the multi-level filtration container (121), wherein the conical liquid-gathering component further enhances the gravity feed-based fluid movement of the deodorized and decontaminated dry-cleaning solvent through an outtake pipe (107).

Furthermore, as shown in FIG. 2, the outtake pipe (107) connects the treated solvent outlet of the multi-level filtration container (121) to a fresh dry-cleaning solvent reserve tank inside the dry-cleaning machine. The outtake pipe (107) is configured to carry a deodorized and decontaminated dry-cleaning solvent that has been treated by the multi-level filtration container (121). In this embodiment of the invention, the treated solvent outlet is located near the bottom of the multi-level filtration container (121), as the gravity feed concept is utilized for multi-stage filtration and treatment of the contaminated dry-cleaning solvent for conversion into the deodorized and decontaminated dry-cleaning solvent that can be pumped back into the dry-cleaning machine.

Figure 3:
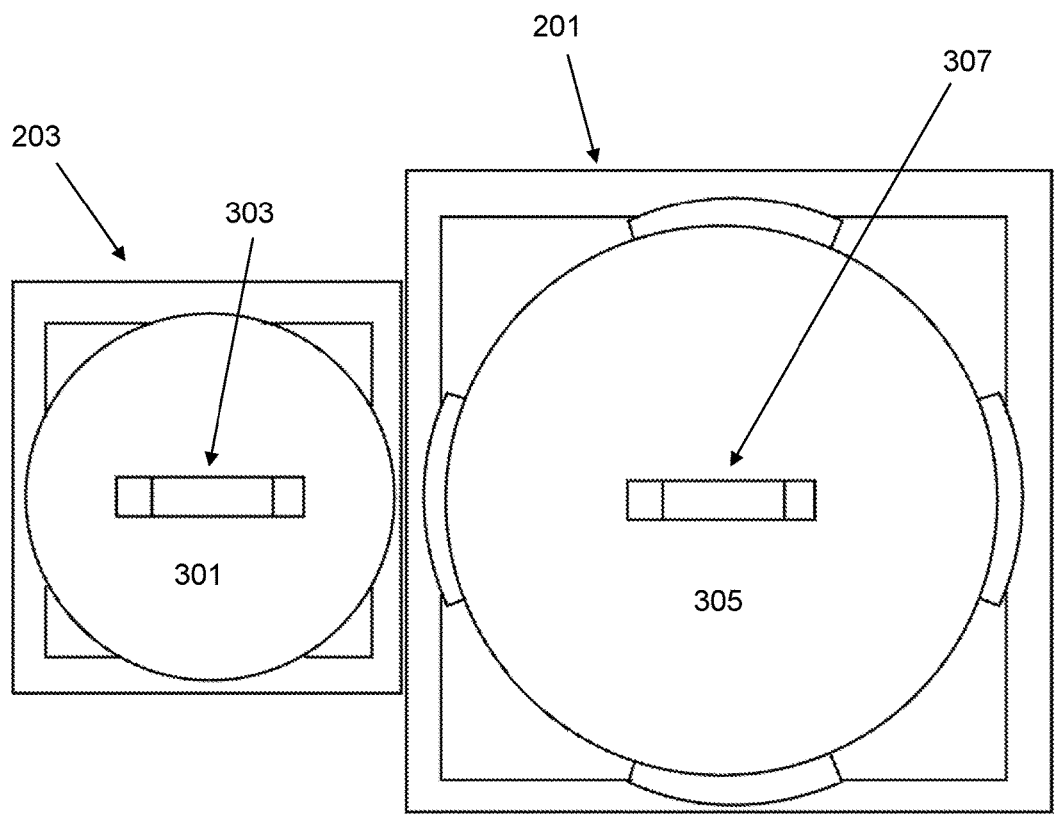
FIG. 3 shows a top view of a dry-cleaning solvent filter apparatus for environmentally-friendly reuse of dry-cleaning solvents, in accordance with an embodiment of the invention.

FIG. 3 shows a top view (300) of a dry-cleaning solvent filter apparatus for environmentally-friendly reuse of dry-cleaning solvents, in accordance with an embodiment of the invention. As shown in FIG. 3, a reserve tank holder (201) encapsulates a dry-cleaning solvent reserve tank and a filtration container holder (203) encapsulates a multi-level filtration container. The top view (300) of the dry-cleaning solvent filter apparatus in FIG. 3 illustrates a multi-level filtration container lid (301) that can be conveniently opened or closed by a dry-clean operator by grabbing a filtration container lid handle (303). Multi-stage filter chambers may need to be periodically cleaned or washed to remove undesirable debris as part of a routine maintenance, and a multi-metallic and multi-chemical clay filtration agent may also need to be periodically cleaned, replenished, or replaced due to debris buildup or chemical degradation over repeated filtering and decontamination processes. Furthermore, the multi-level filtration container may experience structural failures or other malfunctions during the lifecycle of its operation. Therefore, the design incorporation of the filtration container lid handle (303) enables convenient access for routine or emergency maintenance operations.

Likewise, the top view (300) of the dry-cleaning solvent filter apparatus in FIG. 3 also illustrates a dry-cleaning solvent reserve tank lid (305) that can be conveniently opened or closed by the dry-clean operator by grabbing a solvent reserve tank lid handle (307). The dry-cleaning solvent reserve tank may need to be periodically cleaned, washed, inspected, or repaired to ensure its structural integrity and to remove undesirable debris from the tank. Therefore, the design incorporation of the solvent reserve tank lid handle (307) enables convenient access for routine or emergency maintenance operations.

FIG. 4 shows a bottom surface (400) of each filter stage (401) in a multi-level filtration container, which is included in a dry-cleaning solvent filter apparatus for environmentally-friendly reuse of dry-cleaning solvents in accordance with an embodiment of the invention. In a preferred embodiment, each single filter stage (401) incorporates a plurality of micro holes (403) on its bottom surface (400). In one example, six hundred and eighty micro holes are drilled into the bottom surface (400) of a single filter stage (401). The plurality of micro holes (403) are configured to keep a clay filtration agent from getting washed away while allowing systematic filtering and decontamination treatment for a contaminated dry-cleaning solvent that is gravity-fed from a top portion of the multi-level filtration container.

FIG. 5 shows a composition table (500) for a novel "clay" filtration agent comprising unique multi-metallic and multi-chemical compounds for utilization in each filter stage of the dry-cleaning solvent filter apparatus, in accordance with an embodiment of the invention. In a preferred embodiment of the invention, the novel clay filtration agent incorporates silica, aluminum oxide, ferric oxide, magnesium oxide, calcium oxide, sodium oxide, potassium oxide, and IG-loss, as shown in the composition table (500). In the preferred embodiment as shown in the composition table (500), silica is 65.2 percent of the clay filtration agent, while aluminum oxide is 13 percent and ferric oxide is 6 percent of the clay filtration agent. Furthermore, magnesium oxide comprises 1.7 percent, while calcium oxide, sodium oxide, and potassium oxide each occupies 0.5 percent of the clay filtration agent. Other ingredients, such as IG-loss and moisture may occupy the remainder of the clay filtration agent, as shown in the preferred embodiment. In another embodiment, the contribution percentages of each chemical and metallic substance that constitute the unique "clay" filtration agent may be different, depending on a specific need for a decontamination and deodorization objective.

Various compounds utilized in the novel clay filtration agent provide substantial advantages to decontamination and deodorization. In particular, silica provides effective removal of undesirable impurities and particles from the contaminated dry-cleaning solvent. In one example, silica occupies approximately sixty-five percent of the clay filtration agent. Furthermore, aluminum oxide in the clay filtration agent functions as activated alumina that can reduce or remove arsenic, selenium, and fluoride via chemical absorption. In one example, aluminum oxide occupies approximately thirteen percent of the clay filtration agent. Moreover, ferric oxide provides iron oxide absorption of arsenic and other heavy metals from the contaminated dry-cleaning solvent. In one example, ferric oxide occupies approximately six percent of the clay filtration agent. A unique combination of silica, aluminum oxide, and ferric oxide also provides an additional advantage of deodorizing a contaminated perc solution during the filtration process.

Furthermore, magnesium oxide is able to neutralize carbon dioxide in the contaminated dry-cleaning solvent while deacidifying the solution by raising pH levels to alkaline. In one example, magnesium oxide occupies approximately two percent of the clay filtration agent. In addition, calcium oxide can reduce chances of overcorrection to undesirably high alkaline levels, while sodium oxide and potassium oxide can further stimulate chemical reactions among various compounds contained in the clay filtration agent and the contaminated dry-cleaning solvent. The uniquely-combined mixture of multi-metallic and multi-chemical compounds as the "clay" filtration agent in various embodiments of the present invention enables robust decontamination and deodorization processes that are instrumental in reclamation of the already-used dry-cleaning solvent. In contrast, conventional particle filters that are included in a conventional dry-cleaning machine are unable to provide heavy metal and toxic substance removal from the used dry-cleaning solvent, and are especially inadequate at removing foul odor from the used dry-cleaning solvent.

Figure 6:
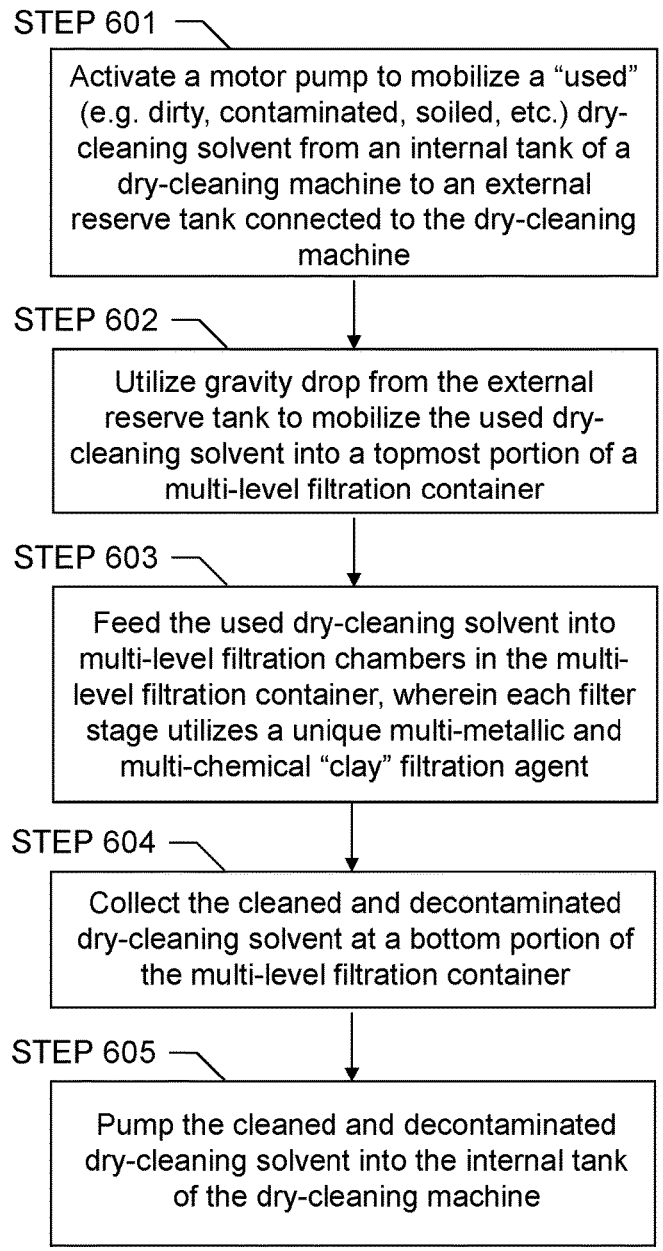
FIG. 6 shows a method of operating a dry-cleaning solvent filter apparatus for environmentally-friendly reuse of dry-cleaning solvents, in accordance with an embodiment of the invention.

FIG. 6 shows a method (600) of operating a dry-cleaning solvent filter apparatus for environmentally-friendly reuse of dry-cleaning solvents, in accordance with an embodiment of the invention. In this embodiment of the invention, a dry-clean operator activates a motorized pump to mobilize a used dry-cleaning solvent from a dry-cleaning machine's internal tank to an external reserve tank connected to the dry-cleaning machine, as shown in STEP 601. The dry-cleaning solvent filter apparatus then utilizes a gravity feed drop from the external reserve tank to further mobilize the used dry-cleaning solvent into a topmost portion of a multi-level filtration container, as shown in STEP 602.

Subsequently, the used dry-cleaning solvent is fed into the multi-level filtration chambers in the multi-level filtration container, wherein each filter stage utilizes unique multi-metallic and multi-chemical "clay" filtration agents, as shown in STEP 603. The cleaned and decontaminated dry-cleaning solvent egresses the multi-level filtration chambers at a bottom portion of the multi-level filtration container, as shown in STEP 604. Lastly, the cleaned and decontaminated dry-cleaning solvent is pumped back into the dry-cleaning machine's internal tank dedicated to storing fresh or refreshed dry-cleaning solvents, as shown in STEP 605.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A dry-cleaning solvent filter apparatus configured to deodorize, detoxify, and reclaim a contaminated dry-cleaning solvent, the dry-cleaning solvent filter apparatus comprising:
    an intake pipe connecting a dry-cleaning machine and a dry-cleaning solvent reserve tank of the dry-cleaning solvent filter apparatus;
    the dry-cleaning solvent reserve tank operatively connected to the dry-cleaning machine via the intake pipe, wherein the intake pipe brings a contaminated dry-cleaning solvent from the dry-cleaning machine into the dry-cleaning solvent reserve tank prior to filtration;
    a multi-level filtration container comprising a first-stage filter chamber with a first set of drilled micro holes on a first solid surface, a second-stage filter chamber with a second set of drilled micro holes on a second solid surface, and a gap separating the first-stage filter chamber and the second-stage filter chamber, wherein the first set and the second set of drilled micro holes hold up a multi-metallic and multi-chemical clay filtration agent from escaping downward while allowing a downward movement of a cleaned solvent;
    the multi-metallic and multi-chemical clay filtration agent removably deposited on top of the first set of drilled micro holes on the first solid surface in the first-stage filter chamber, and also removably deposited on top of the second set of drilled micro holes on the second solid surface in the second-stage filter chamber, wherein the multi-metallic and multi-chemical clay filtration agent deposited in each chamber is physically separated by the gap between the first-stage filter chamber and the second-stage filter chamber;
    a reserve tank-to-filtration container pipe that connects the dry-cleaning solvent reserve tank and the multi-level filtration container to mobilize the contaminated dry-cleaning solvent from the dry-cleaning reserve tank to a top portion of the multi-level filtration container; and
    an outtake pipe connecting a treated solvent outlet of the multi-level filtration container to a fresh dry-cleaning solvent reserve tank inside the dry-cleaning machine, wherein the outtake pipe carries a deodorized and decontaminated dry-cleaning solvent that has been treated by the multi-level filtration container.

2. The dry-cleaning solvent filter apparatus of claim 1, wherein the multi-metallic and multi-chemical clay filtration agent comprises silica, aluminum oxide, ferric oxide, magnesium oxide, calcium oxide, sodium oxide, and potassium oxide for efficient decontamination and deodorization of the contaminated dry-cleaning solvent.

3. The dry-cleaning solvent filter apparatus of claim 1, further comprising a motorized pump configured to move the contaminated dry-cleaning solvent from the dry-cleaning machine to the dry-cleaning solvent reserve tank.

4. The dry-cleaning solvent filter apparatus of claim 1, further comprising a conical liquid-gathering component near the treated solvent outlet of the multi-level filtration container to provide a gravity-feed movement of the deodorized and decontaminated dry-cleaning solvent through the outtake pipe.

5. The dry-cleaning solvent filter apparatus of claim 1, further comprising a reserve tank holder and a filtration container holder, wherein the reserve tank holder is configured to keep the dry-cleaning solvent reserve tank at a higher elevation than an elevation provided to the multi-level filtration container by the filtration container holder to ensure a gravity-feed fluid transfer from the dry-cleaning solvent reserve tank to the multi-level filtration container.

6. The dry-cleaning solvent filter apparatus of claim 1, wherein the multi-level filtration container is cylindrical in shape.

7. The dry-cleaning solvent filter apparatus of claim 1, wherein the first set of drilled micro holes in the first-stage filter chamber and the second set of drilled micro holes in the second-stage filter chamber are configured to hold the multi-metallic and multi-chemical clay filtration agent in place while allowing a treated dry-cleaning solvent to egress each stage of filtering.

* * * * *